(12) United States Patent
Akabori et al.

(10) Patent No.: US 8,199,509 B2
(45) Date of Patent: Jun. 12, 2012

(54) ELECTRONIC EQUIPMENT

(75) Inventors: Takahiro Akabori, Gunma (JP); Yuito Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 12/784,102

(22) Filed: May 20, 2010

(65) Prior Publication Data
US 2010/0315785 A1    Dec. 16, 2010

(30) Foreign Application Priority Data

Jun. 12, 2009 (JP) .................................. 2009-141599

(51) Int. Cl.
H05K 7/20 (2006.01)
F28F 7/00 (2006.01)
H01L 23/34 (2006.01)

(52) U.S. Cl. ....... 361/719; 257/719; 165/80.2; 165/185; 361/690; 361/704; 361/707; 361/715

(58) Field of Classification Search .................. 361/719
See application file for complete search history.

(56) References Cited

U.S. PATENT DOCUMENTS

| | | | | | |
|---|---|---|---|---|---|
| 5,065,280 | A | * | 11/1991 | Karnezos et al. | 361/715 |
| 6,365,964 | B1 | * | 4/2002 | Koors et al. | 257/718 |
| 6,998,706 | B2 | * | 2/2006 | Lawlyes | 257/712 |
| 7,023,699 | B2 | * | 4/2006 | Glovatsky et al. | 361/704 |
| 7,031,165 | B2 | * | 4/2006 | Itabashi et al. | 361/719 |
| 7,064,963 | B2 | * | 6/2006 | Oman et al. | 361/792 |
| 2004/0233642 | A1 | * | 11/2004 | Ito et al. | 361/720 |
| 2008/0186681 | A1 | * | 8/2008 | Deck et al. | 361/719 |
| 2010/0165579 | A1 | * | 7/2010 | Li et al. | 361/719 |
| 2010/0290194 | A1 | * | 11/2010 | Wu | 361/719 |

FOREIGN PATENT DOCUMENTS

| | | |
|---|---|---|
| JP | 3-15484 | 2/1991 |
| JP | 8-222667 | 8/1996 |
| JP | 2008-166389 | 7/2008 |

* cited by examiner

*Primary Examiner* — Gregory Thomspon
(74) *Attorney, Agent, or Firm* — Oblon, Spivak, McClelland, Maier & Neustadt, L.L.P.

(57) ABSTRACT

An electronic equipment includes: an attachment plate; attachments disposed on the attachment plate and each provided with a female screw; a printed circuit board placed on the attachments; electronic parts mounted on the surface of the printed circuit board opposite to the attachments, and whose surfaces opposite to the surface of the printed circuit board serves as heat release surfaces; and a heat sink having a thermal-conduction surface and screw insertion holes. The thermal-conduction surface is abutted in common against the heat release surfaces with a heat release grease between them, male screws inserted into the screw insertion holes are penetrated through the printed circuit board, and meshed with the female screws threaded in the attachments, the heat sink is attached together with the printed circuit board to the attachments, and at least one of the attachments can be displaced in the thickness direction of the printed circuit board.

8 Claims, 12 Drawing Sheets

ELECTRONIC EQUIPMENT

BACKGROUND OF THE INVENTION

1. Field of the Invention

The present invention relates to an electronic equipment.

2. Description of the Related Art

Electronic parts constituting an electronic equipment, for example, electronic parts such as an IC that realizes an amplification circuit included in an audio equipment, and a CPU and a control LSI included in a computer dissipate heat while being in action.

Therefore, these electronic parts are requested to have the actions thereof stabilized or to release heat using a heat sink for the purpose of extending the service lives thereof.

For a construction in which plural electronic parts are mounted on the mounting surface of a printed circuit board, the surface of a sole heat sink is conceivably abutted against the electronic parts in order to release heat.

In this case, if the electronic parts are obliquely mounted or the printed circuit board is deformed in the thickness direction thereof, a gap is created between the heat sink and electronic parts.

Once the gap is created, the thermal conductivity is not exerted in the interface between the heat sink and electronic parts. Therefore, heat dissipated from the electronic parts is not effectively released.

A proposal has been made of a construction in which a heat sink is attached to the surface of the packages of electronic parts via a thermal-conduction sheet (heat release sheet) made of a material capable of being elastically deformed, such as, thermally conductive rubber (refer to JP-A-8-222667 (patent document 1)).

According to the construction, the heat sink and electronic parts are fastened to each other using screws with the thermal-conduction sheet interposed between the heat sink and the packages of electronic parts. The gap can thus be filled with the thermal-conduction sheet. Accordingly, the thermal conductivity of the interface between the heat sink and electronic parts can be ensured, and heat dissipated from the electronic parts can be effectively released.

SUMMARY OF THE INVENTION

However, the thermal-conduction sheet costs high, and it is labor-intensive to attach the thermal-conduction sheet. This is disadvantageous in reducing the cost. In addition, the thermal conductivity of the thermal-conduction sheet is not enough to effectively release heat.

A heat release grease that is more inexpensive and superior in thermal conductivity than the thermal-conduction sheet is conceivably replaced with the thermal-conduction sheet, and applied to the gap between the electronic parts and heat sink. Thus, the cost can be reduced and the heat release efficiency can be upgraded.

However, the heat release grease is not, unlikely to the thermal-conduction sheet, elastically deformed.

Therefore, when the heat release grease is employed, if a gap is creased between the heat sink and the packages of electronic parts because of the tilt of the electronic parts or the deformation of a printed circuit board, the thermal conductivity may not be exerted in the interface between the heat sink and electronic parts.

Therefore, there is difficulty in adopting the heat release grease in place of the thermal-conduction sheet.

Thus, there is a need for an electronic equipment that is advantageous in reducing a cost and effectively releasing heat dissipated from electronic parts.

According to an embodiment of the present invention, there is provided an electronic equipment including: an attachment plate; plural attachments disposed on the attachment plate and each provided with a female screw; a printed circuit board placed on the plural attachments; plural electronic parts which are mounted on the surface of the printed circuit board opposite to the attachments and whose surfaces opposite to the surface of the printed circuit board are formed as heat release surfaces; and a heat sink having a thermal-conduction surface and plurality screw insertion holes. The thermal-conduction surface is abutted in common against the heat release surfaces of the plural electronic parts with a heat release grease between them. The male screws inserted into the screw insertion holes are penetrated through the printed circuit board, and meshed with female screws threaded in the plural attachments. The heat sink is attached together with the printed circuit board to the attachments. At least one of the plural attachments can be displaced in the thickness direction of the printed circuit board.

According to the embodiment of the present invention, at least one of the plural attachments to be used to attach the heat sink together with the printed circuit board can be displaced in the thickness direction of the printed circuit board.

Therefore, the thermal-conduction surface and heat release surface are brought into nearly close contact with each other via the heat release grease by eliminating the gap between the thermal-conduction surface and heat release surfaces which is derived from the tilt of the electronic parts or the warp of the printed circuit board.

Therefore, the inexpensive heat release grease can be substituted for the thermal-conduction sheet. This is advantageous in effectively releasing heat dissipated from electronic parts while reducing a cost.

DESCRIPTION OF THE PREFERRED EMBODIMENTS (First Embodiment)

Next, an embodiment of the present invention will be described with reference to FIG. 1 to FIG. 11.

The present embodiment will be described on the assumption that an electronic equipment 10 is a DVD player included in a home theater.

To begin with, a control system included in the electronic equipment 10 will be described in conjunction with FIG. 1.

Figure 1:
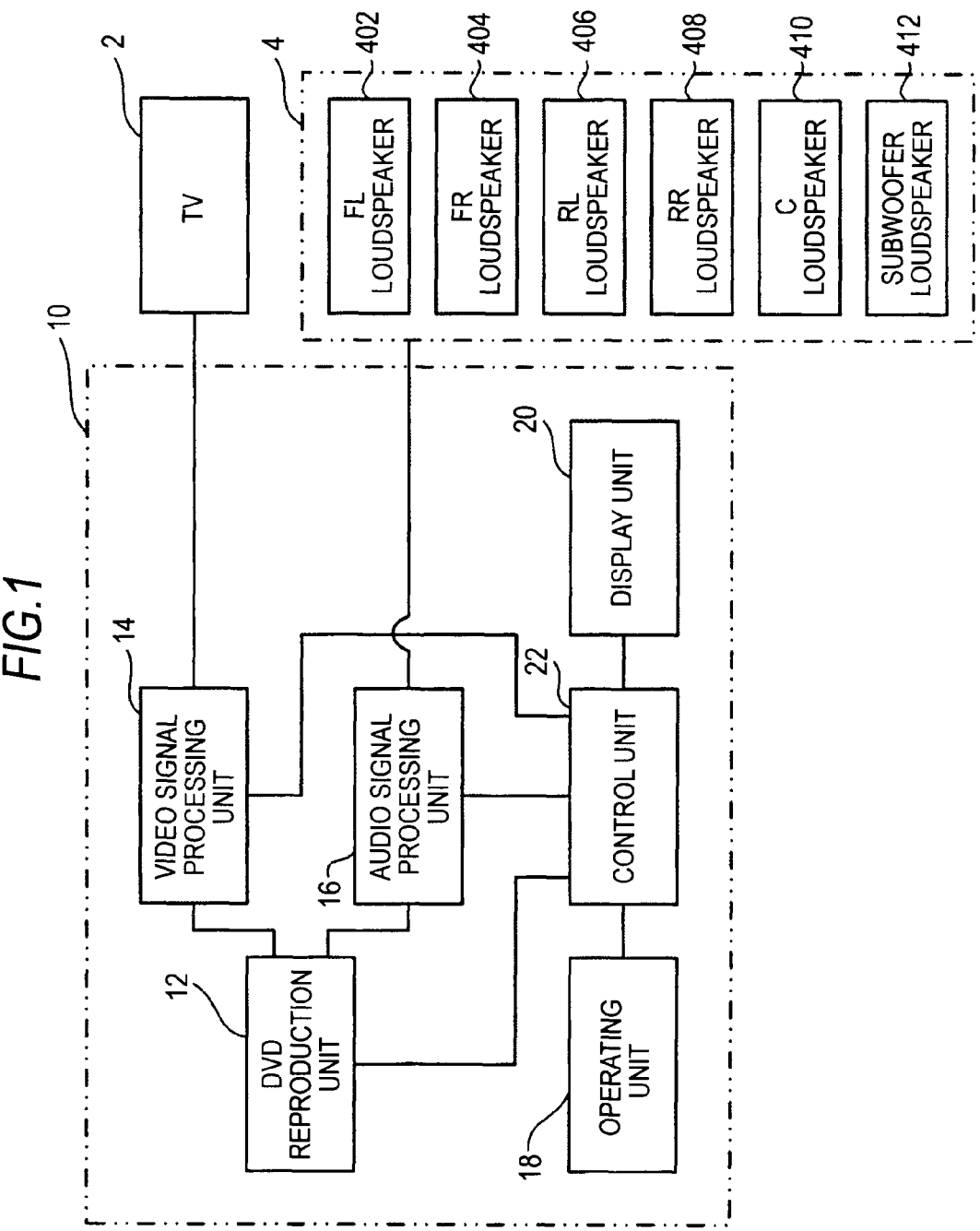
FIG. 1 is a block diagram showing the configuration of a control system included in an electronic equipment.

As shown in FIG. 1, the electronic equipment 10 is used while being connected to a television set 2 and a loudspeaker system 4.

The television set 2 displays a picture according to a video signal fed from the electronic equipment 10.

The loudspeaker system 4 outputs sounds according to an audio signal fed from the electronic equipment 10.

In the present embodiment, the loudspeaker system 4 reproduces sounds in, for example, a 5.1-channel surround sound mode.

The loudspeaker system 4 includes six loudspeakers, that is, a front left-channel loudspeaker 402, a front right-channel loudspeaker 404, a rear left-channel loudspeaker 406, a rear right-channel loudspeaker 408, a center-channel loudspeaker 410, and a subwoofer loudspeaker 412.

The electronic equipment 10 includes a DVD reproduction unit 12, a video signal processing unit 14, an audio signal processing unit 16, an operating unit 18, a display unit 20, and a control unit 22.

The DVD reproduction unit 12 reproduces a video signal and an audio signal from a DVD.

The video signal processing unit 14 performs known signal processing on a video signal fed from the DVD reproduction unit 12, converts the video signal into a video output signal conformable to a predetermined standard, and feeds the video output signal to the television set 2.

The audio signal processing unit 16 performs known signal processing on an audio signal fed from the DVD reproduction unit 12, converts the audio signal into audio output signals conformable to the predetermined standard, and feeds the audio output signals to the loudspeaker system 4.

In the present embodiment, the audio signal processing unit 16 produces six audio output signals, which are associated with the six loudspeakers, and amplifies and outputs the audio output signals so as to reproduce sounds in the 5.1-channel surround sound mode.

The operating unit 18 includes various switches and variable resistors which are used to perform desired manipulations or desired setting in relation to the DVD reproduction unit 12, video signal processing unit 14, or audio signal processing unit 16.

The display unit 20 displays the acting state of the DVD reproduction unit 12, video signal processing unit 14, or audio signal processing unit 16, or displays the contents of a manipulation, which is performed on the operating unit 18, using characters, an icon, or an image.

The control unit 22 controls the actions of the DVD reproduction unit 12, video signal processing unit 14, and audio signal processing unit 16 according to a manipulation performed on the operating unit 18, or controls the displaying action of the display unit 20.

Next, the gist of the present embodiment will be described in conjunction with FIG. 2 to FIG. 4.

The electronic equipment 10 has a housing 24.

Figure 2:
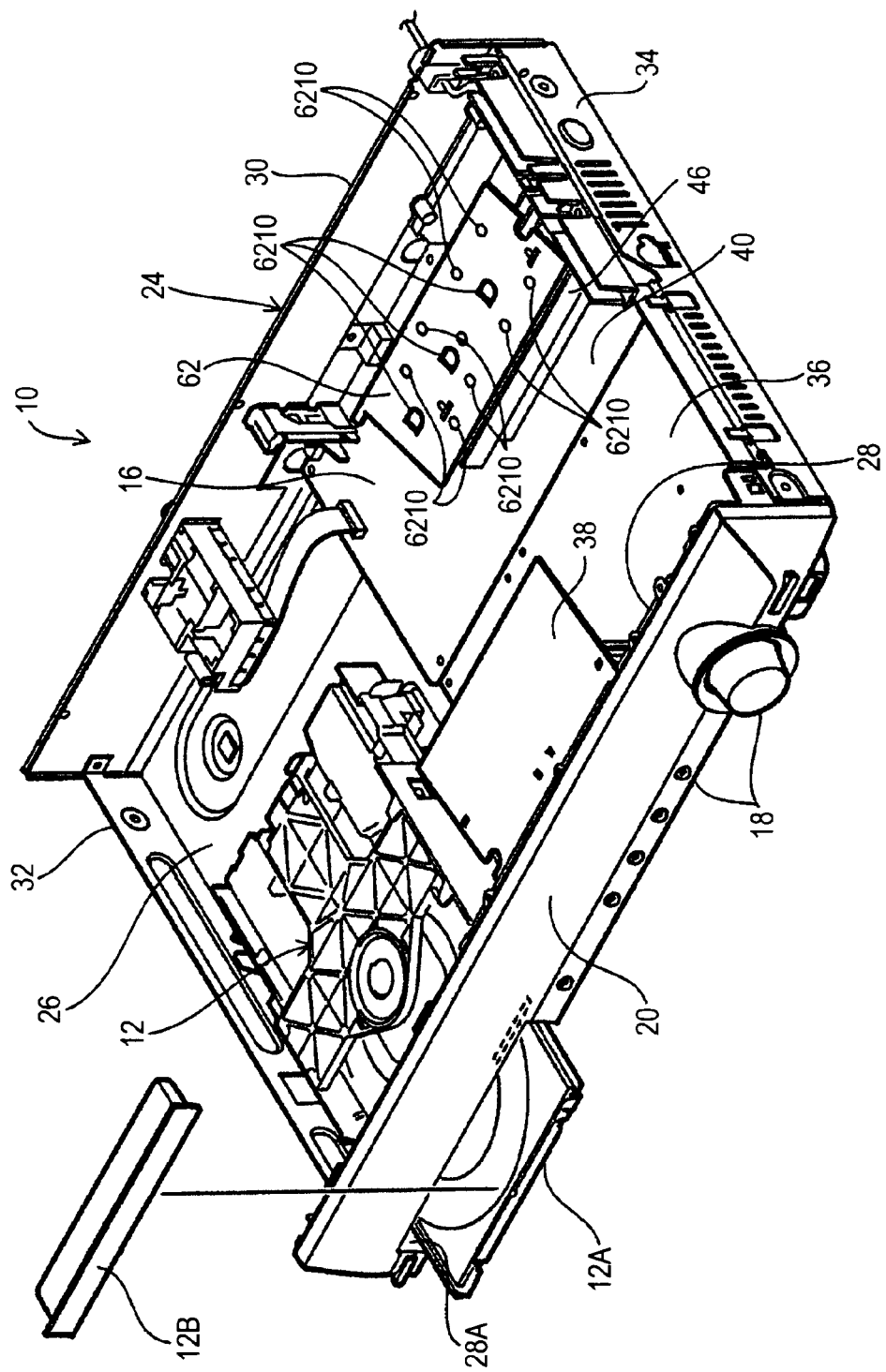
FIG. 2 is a perspective view showing the overall construction of the electronic equipment.
Figure 3:
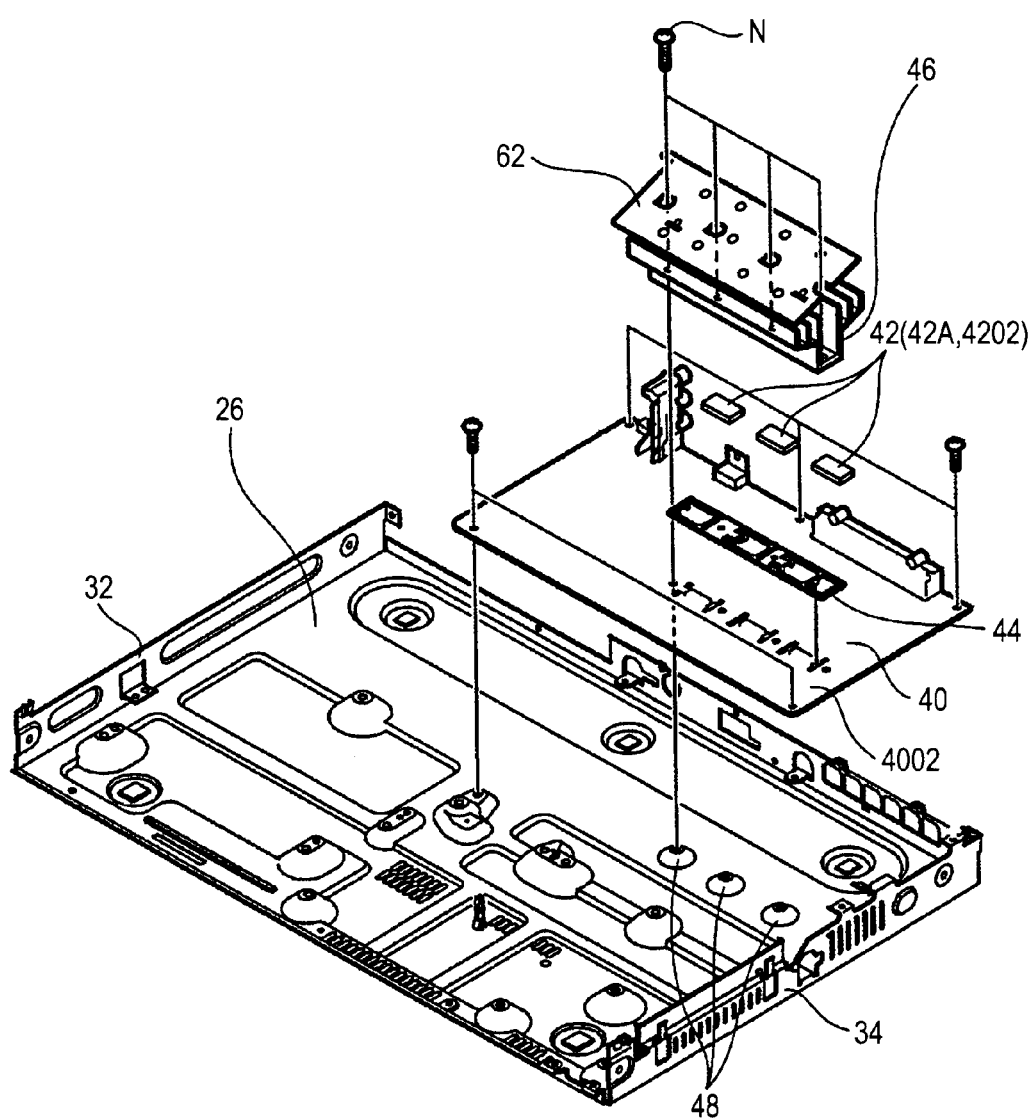
FIG. 3 is an exploded perspective view for use in explaining attachment of a second printed circuit board and a heat sink that are included in the electronic equipment.

As shown in FIG. 2 and FIG. 3, the housing 24 is made of a metal and produced through drawing.

Figure 4:
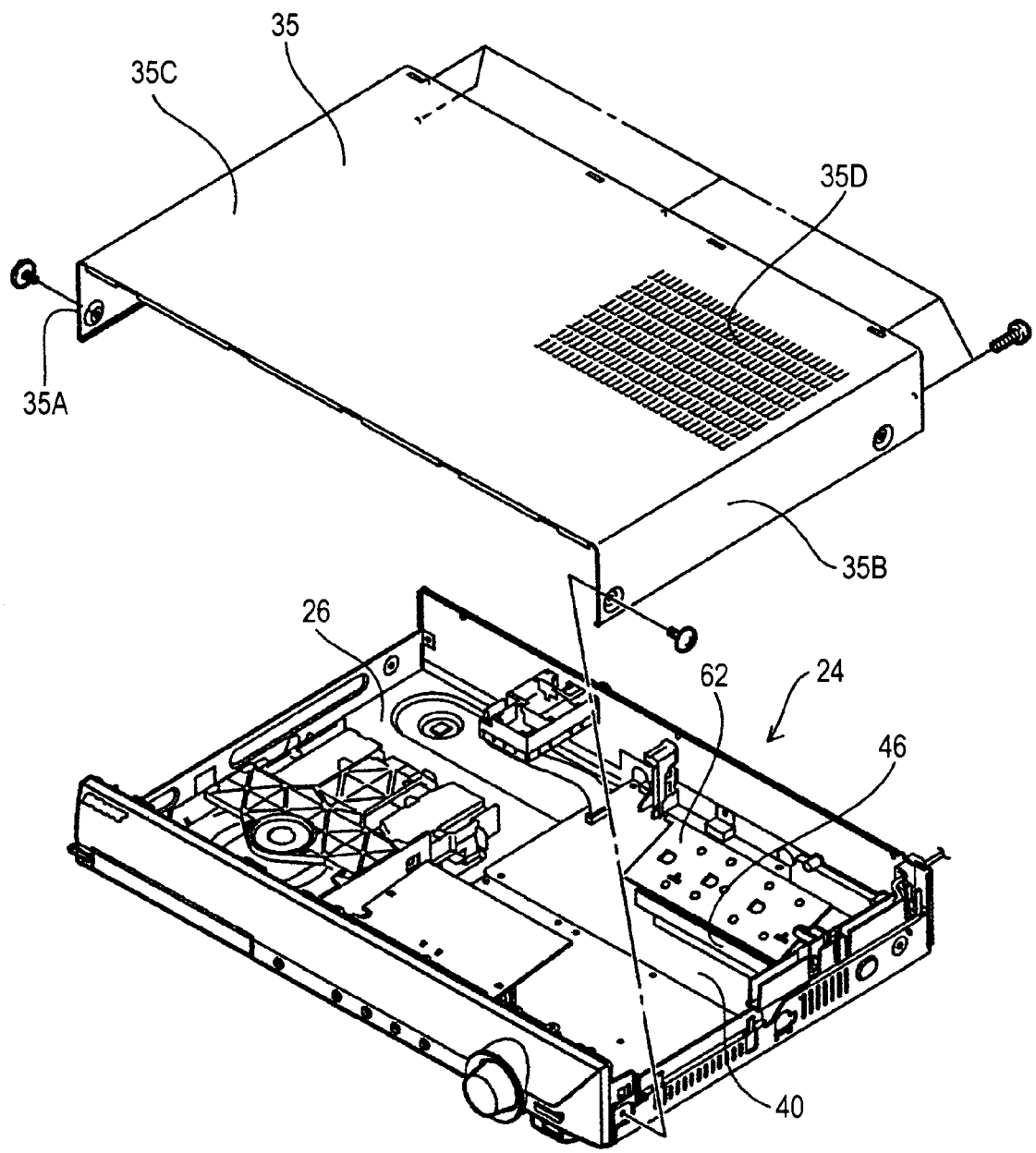
FIG. 4 is a perspective view showing a state of the electronic equipment having an upper cover thereof removed.

The housing 24 includes a rectangular bottom plate 26, a front plate 28 that rises from the front edge of the bottom plate 26, a rear plate 30 that rises from the rear edge of the bottom plate 26, left and right side plates 32 and 34 that rise from the left and right edges of the bottom plate 26, and an upper cover 35 (FIG. 4).

The upper cover 35 includes two sidewalls 35A and 35B to be mounted on the external surfaces of the left and right side plates 32 and 34 respectively, and an upper wall 35C that links the upper edges of the sidewalls 35A and 35B respectively and blocks the space defined by the front plate 28, rear plate 30, and left and right side plates 32 and 34.

As shown in FIG. 4, numerous slits 35D for releasing heat are formed in the right rear part of the upper wall 35C opposed to a current plate 62, which will be described later, in such a manner that the slits are juxtaposed within a rectangular frame.

The operating unit 18 and display unit 20 are disposed on the front surface of the front plate 28.

The DVD reproduction unit 12 shaped like a flat rectangular plate is disposed on the left front part of the bottom plate 26.

The DVD reproduction unit 12 includes a tray 12A that is used to insert or eject a DVD. The tray 12A projects or withdraws through an opening 28A formed in the front plate 28. Reference numeral 12B denotes a lid plate that blocks the opening 28A and is attached to the front part of the tray 12A.

On the right front part of the bottom plate 26, a first printed circuit board 36 and a current plate 38 disposed to overlap the first printed circuit board 36 are placed up and down with a gap between them.

On the right rear part of the bottom plate 26, a second printed circuit board 40 shaped like a rectangular plate is placed.

On the first printed circuit board 36 and second printed circuit board 40, passive parts such as resistors and capacitors and active parts such as transistors, ICs, and LSIs are mounted in order to form electronic circuits.

The electronic circuits on the first and second printed circuit boards 36 and 40 realize the video signal processing unit 14, audio signal processing unit 16, and control unit 22.

In the present embodiment, the second printed circuit board 40 contains an amplification circuit that amplifies the aforesaid audio output signals which are fed to the loudspeaker system 4, and that is included in the audio signal processing unit 16.

To be more specific, as shown in FIG. 3, the plural electronic parts 42 constituting the amplification circuit are mounted on the mounting surface 4002 of the second printed circuit board 40.

In the present embodiment, the plural electronic parts 42 are three ICs 42A shaped like flat rectangular strips.

In the present embodiment, the ICs 42A are mounted on the mounting surface 4002 using a holder 44.

The surfaces of the ICs 42A in the thickness direction thereof that face in a direction opposite to the direction of the mounting surface 4002 are formed as heat release surfaces 4202 from which heat the ICs 42A dissipate while being in action is released.

Next, attachment of the printed circuit board and heat sink 46 which is the gist of the present invention will be described below.

As shown in FIG. 3, FIG. 5, FIG. 6, and FIG. 7, plural attachments 48 are disposed on the bottom plate 26 of the housing 24. In the present embodiment, an attachment plate on which the plural attachments 48 are disposed is realized with the bottom plate 26 of the housing 24.

The plural attachments 48 are linearly juxtaposed.

Each of the attachments 48 includes a leg portion 50 that rises like a conical surface from the bottom plate 26, and an attachment surface portion 54 that is formed on the distal part of the leg portion 50 and has a female screw 52 threaded therein.

The second printed circuit board 40 is placed on the attachment surface portions 54 of the plural attachments 48. In the present embodiment, the printed circuit board that is an object to be attached is the second printed circuit board 40.

Figure 5:
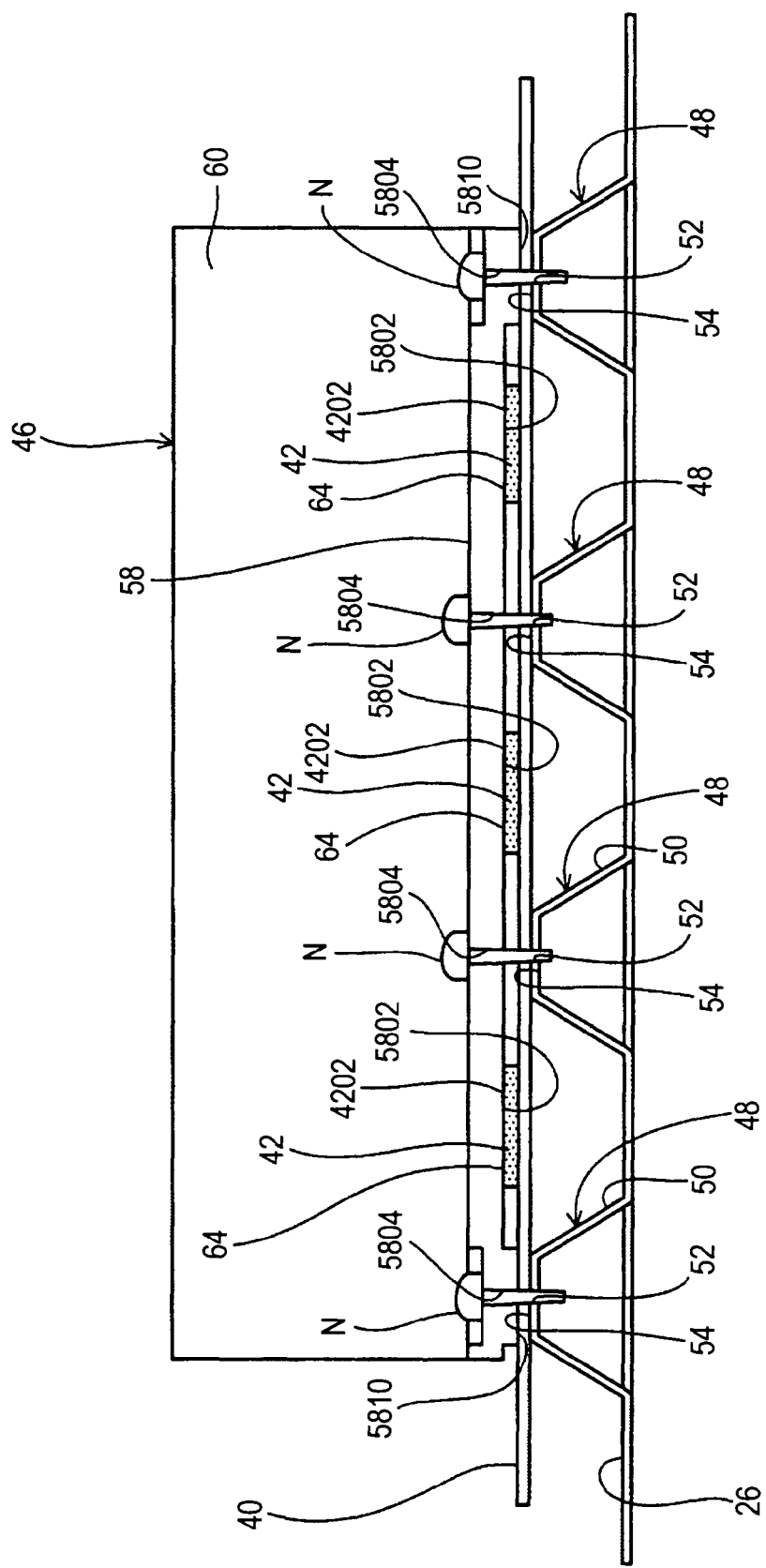
FIG. 5 is a sectional view showing the structure of the second printed circuit board and heat sink attached to a bottom plate.

In FIG. 5, for a better understanding, the electronic parts 42 are shown to have numerous dots.

The attachments 48 at both ends out of the linearly juxtaposed attachments are not permitted to be displaced in the thickness direction of the second printed circuit board 40, while the intermediate attachments 48 can be displaced in the thickness direction of the second printed circuit board 40.

Figure 6:
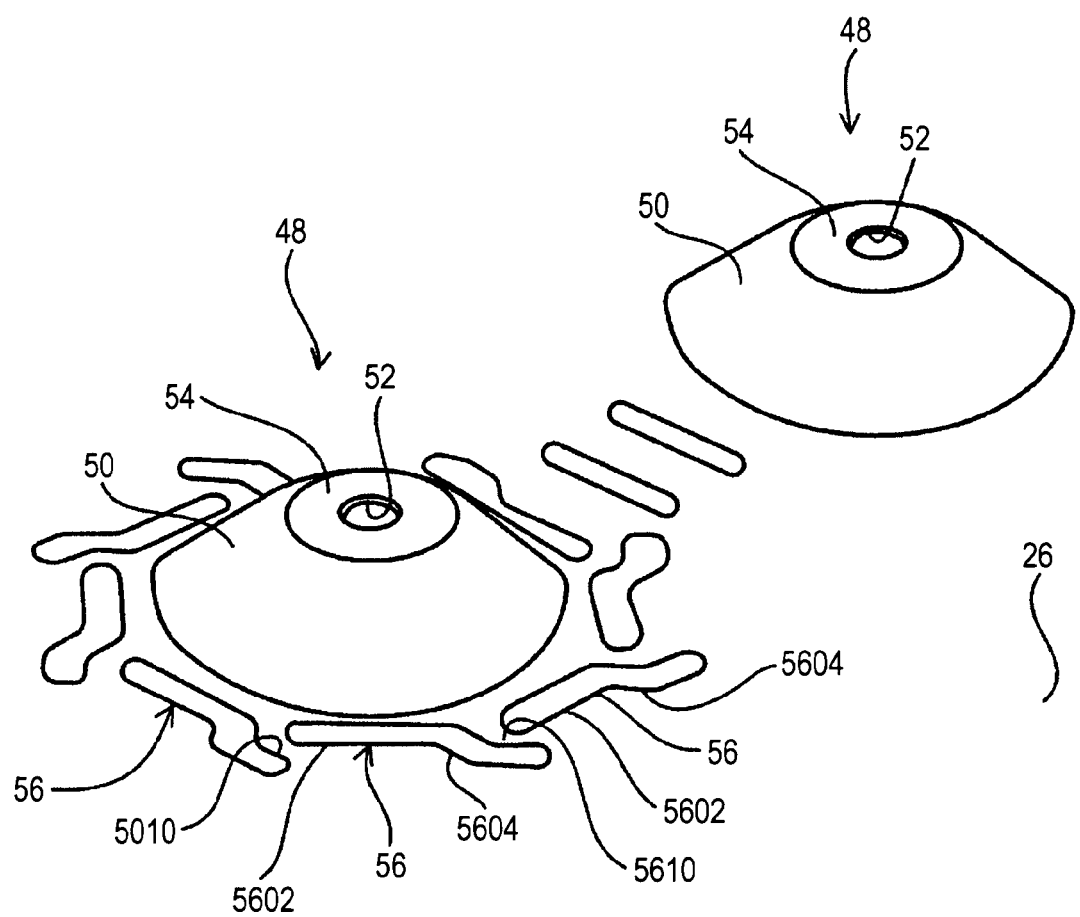
FIG. 6 is a perspective view of attachments.
Figure 7:
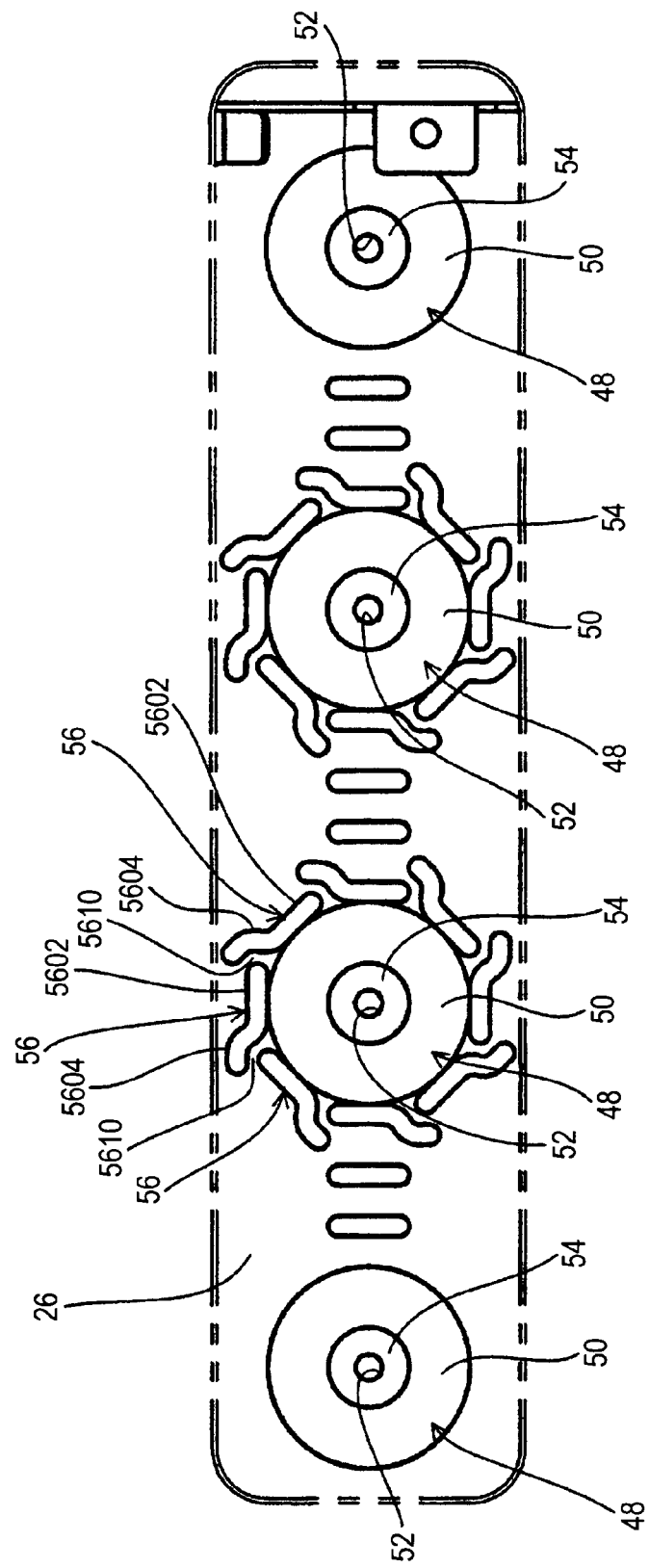
FIG. 7 is a plan view of the attachments.
Figure 8:
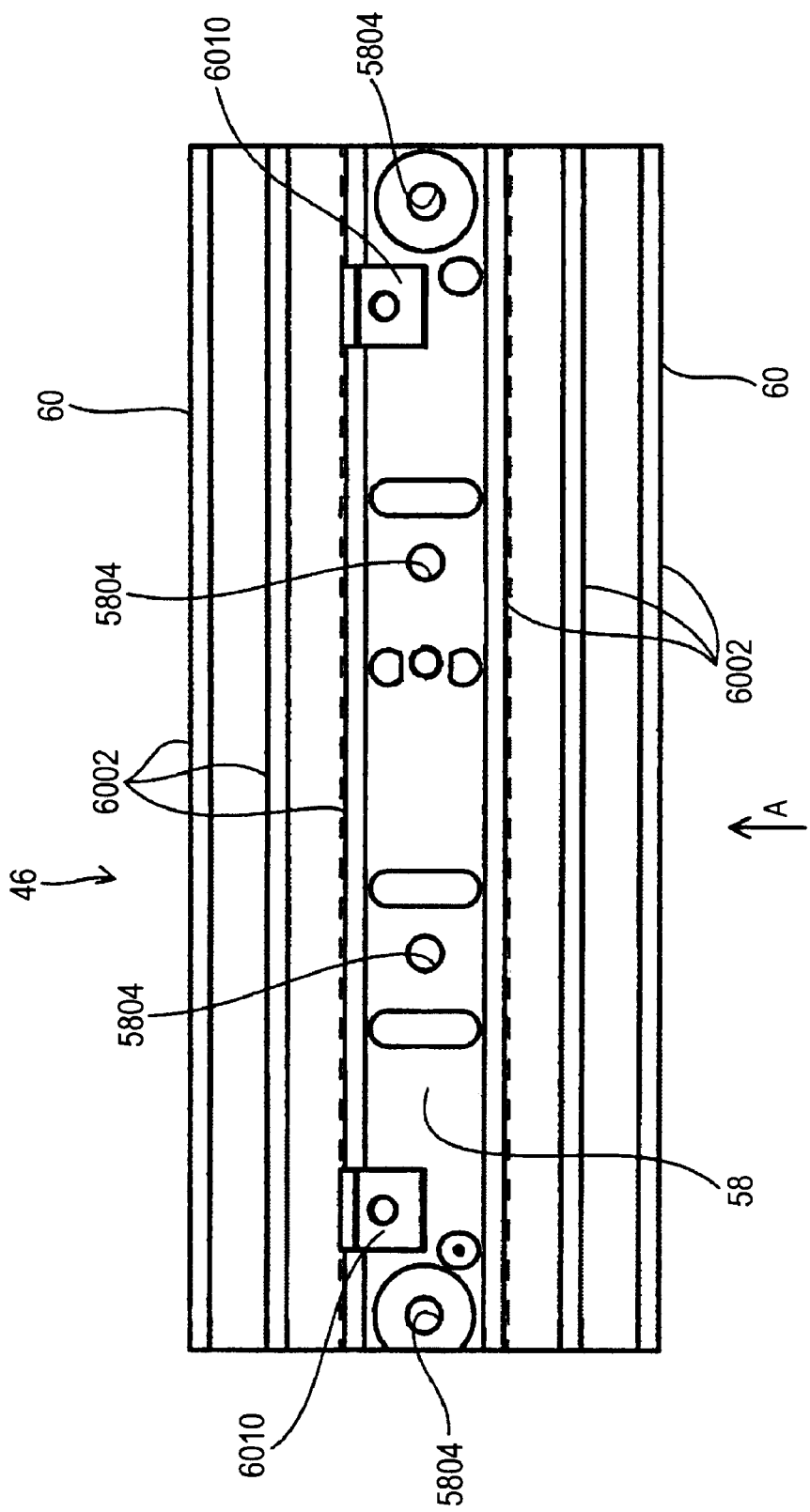
FIG. 8 is a plan view of the heat sink devoid of a current plate.
Figure 9:
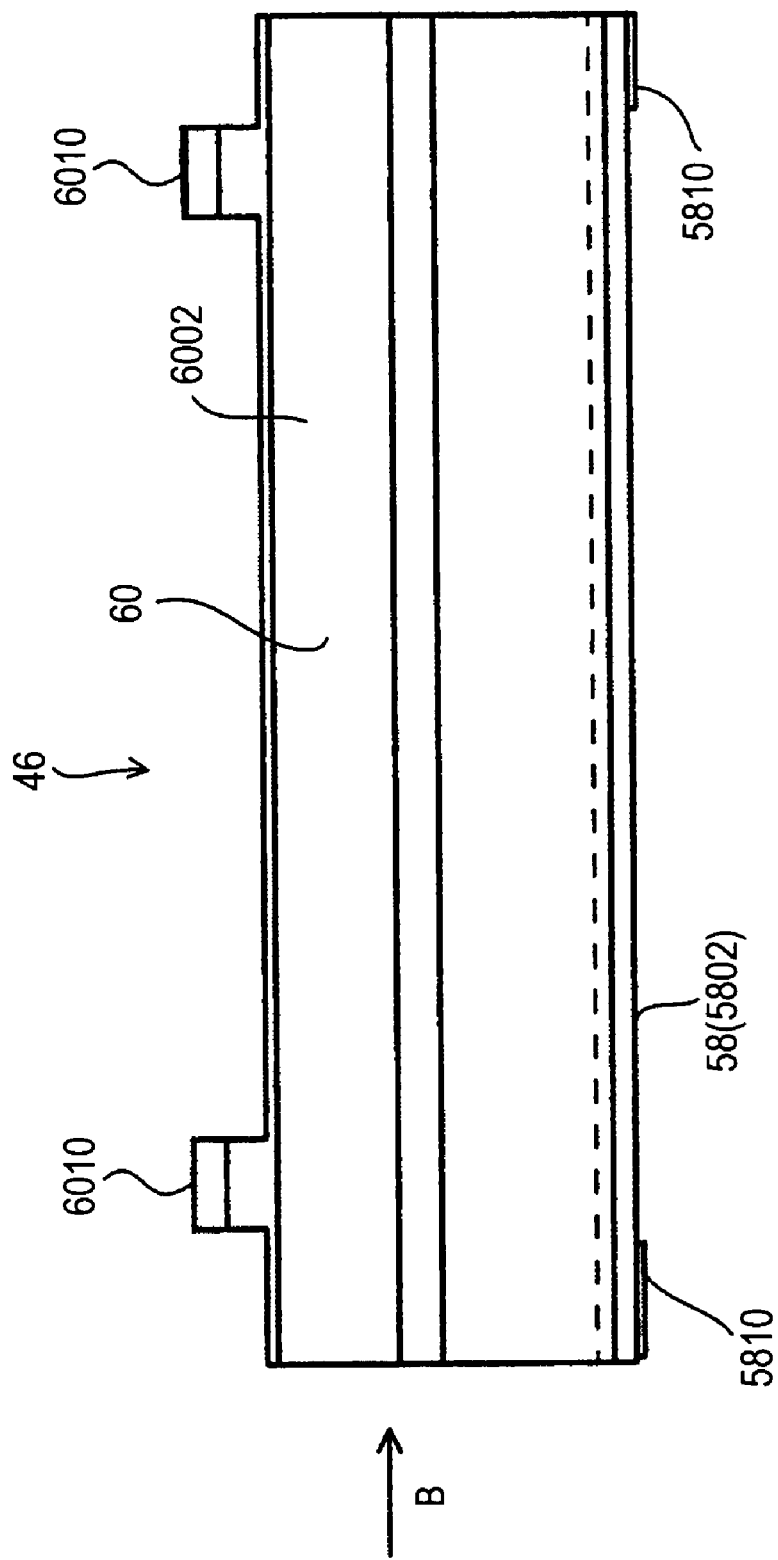
FIG. 9 is a sectional view of the heat sink along a cutting-plane line indicated with an arrow A shown in FIG. 8.
Figure 10:
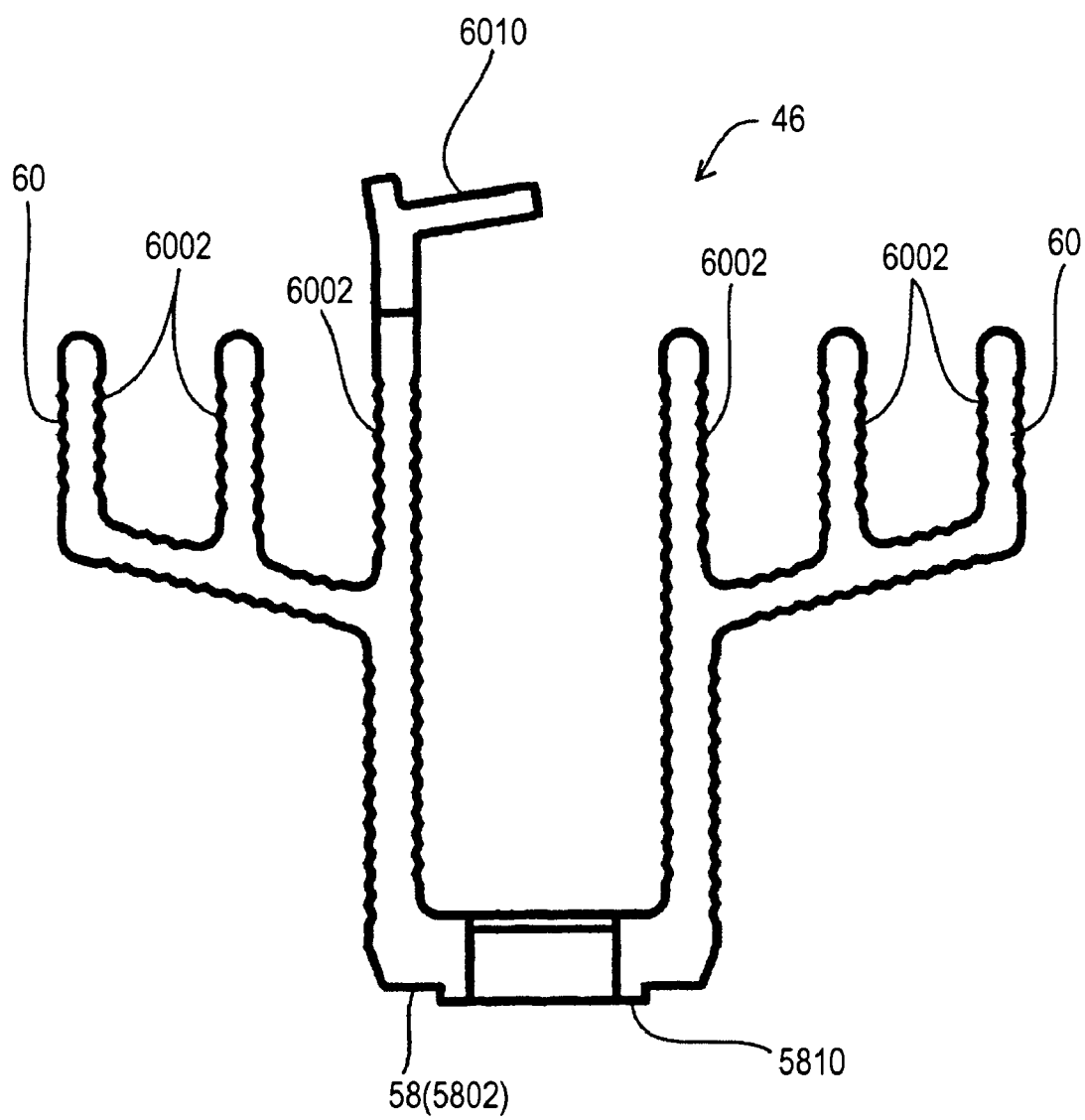
FIG. 10 is a sectional view of the heat sink along a cutting-plane line indicated with an arrow B shown in FIG. 9.

To be more specific, as shown in FIG. 6 and FIG. 7, plural slits 56 are formed in the bottom plate 26 around the leg portions 50 of the two attachments 48 interposed between the attachments 48 at both ends in such a manner that the slits equidistantly adjoin one another in the circumferential direction of each of the leg portions 50.

Each of the slits 56 includes a first extending portion 5602 that extends along the proximal part of the leg portion 50 opposite to the distal part thereof, and a second extending portion 5604 that extends from the end of the first extending portion 5602 in a direction orthogonal to the radial direction of the leg portion 50.

Owing to the adjoining slits 56, plural thin pieces 5610 that extend in the direction orthogonal to the radial direction of each of the leg portions 50 and that can be elastically deformed are formed.

Specifically, when the plural thin pieces 5610 are elastically deformed, the two attachments 48 interposed between the attachments 48 at both ends are displaced in the thickness direction of the second printed circuit board 40.

As shown in FIG. 8 to FIG. 11, the heat sink 46 includes a base portion 58, a heat release member 60, and a current plate 62.

The base portion 58 has a rectangular shape.

As shown in FIG. 5, one of the surfaces of the base portion 58 is formed as a thermal-conduction surface 5802 that is abutted in common against the heat release surfaces 4202 of the plural electronic parts 42, which face in a direction opposite to the direction of the second printed circuit board 40, with the heat release grease 64 between them.

Plural screw insertion holes 5804 are equidistantly penetrated through the base portion 58 in the long-side direction of the base portion 58 in the center in the short-side direction of the base portion 58.

At the ends of the thermal-conduction surface 5802 in the longitudinal direction thereof, bosses 5810 having the same thickness as the thickness of the electronic parts 42 are formed. The two screw insertion holes 5804 located at both ends out of the plural screw insertion holes 5804 are penetrated through the bosses 5810.

The heat release member 60 includes plural fins 6002 that rise from the other surface of the base portion 58.

The plural fins 6002 rise in parallel with the long side of the base portion 58 and extend in parallel with one another.

The surfaces of the fins 6002 are provided with irregularities to serve as heat release surfaces.

The current plate 62 is shaped like a rectangular plate, disposed to cover the plural fins 6002 from above the plural fins, and tilted with respect to the horizontal plane.

Figure 11:
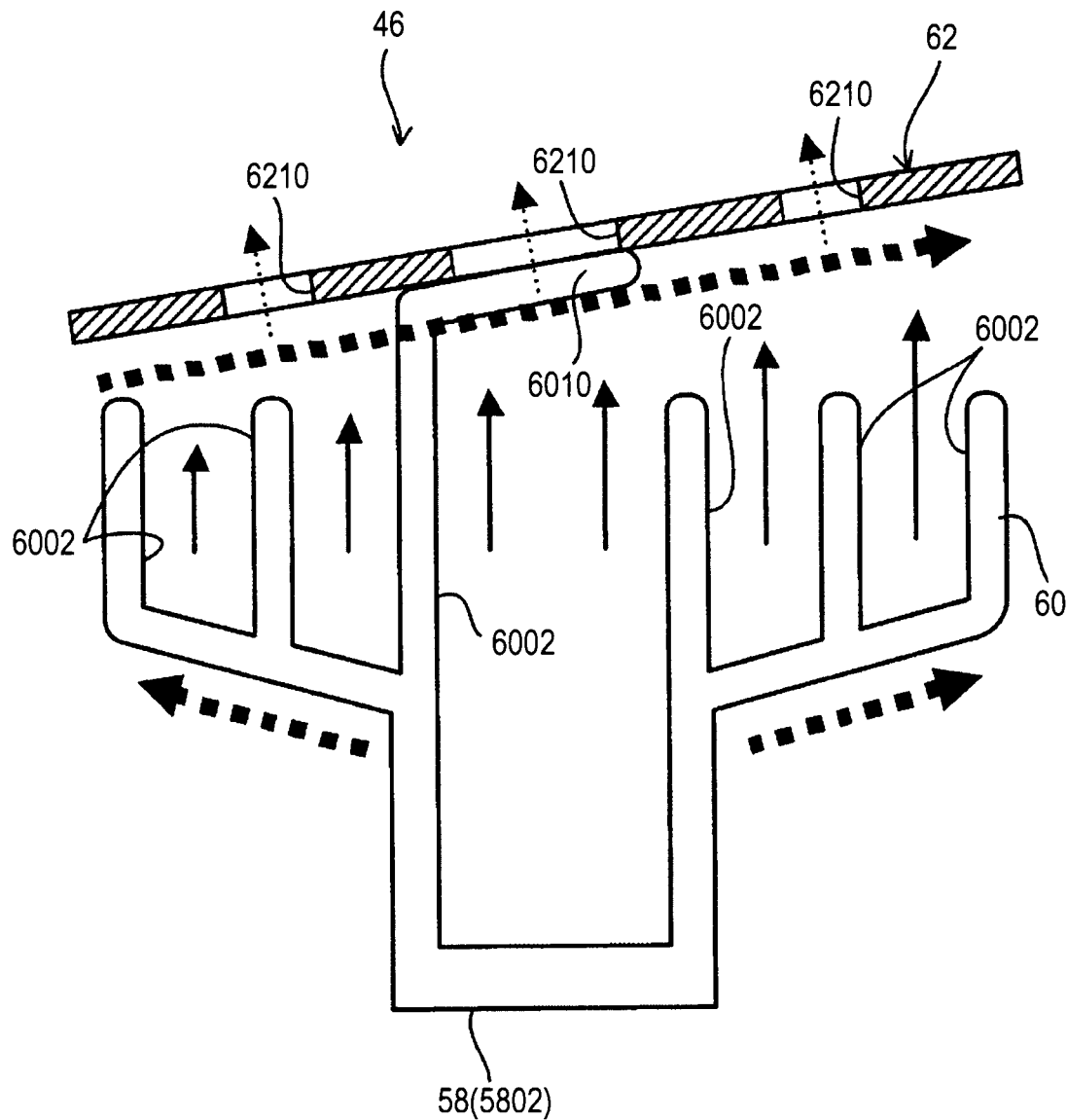
FIG. 11 is a side view of the heat sink including the current plate.

As shown in FIG. 2 and FIG. 11, plural heat release holes 6210 are formed in the current plate 62 in the long-side direction of the current plate 62 in the center in the short-side direction thereof. Further, plural heat release holes 6210 are formed to sandwich the heat release holes 6210 in the short-side direction of the current plate 62.

The current plate 62 is borne by one of the plural fins 6002 while having the upper ends thereof fixed to the ends of one of the plural fins 6002 in the longitudinal direction thereof by means of clamps 6010.

The current plate 62 may be made of a material different from the material made into the base portion 58 and heat release member 60, or may be made of the same material.

The second printed circuit board 40 and heat sink 46 are attached to the housing 24 as described below.

Beforehand, the heat release grease 64 is applied to either or both of the thermal-conduction surface 5802 and heat release surfaces 4202.

Thereafter, the thermal-conduction surface 5802 is abutted in common against the heat release surfaces 4202 of the plural electronic parts 42 with the heat release grease 64 between them.

In this state, the bosses 5810 at the ends of the base portion are abutted on the second printed circuit board 40. A gap is preserved around the two intermediate attachments 48 between the thermal-conduction surface 5802 and second printed circuit board 40.

Male screws N inserted into the screw insertion holes 5804 are penetrated through the second printed circuit board 40, and meshed with the female screws 52 threaded in the plural attachments 48.

The heat sink 46 is attached together with the second printed circuit board 40 to the attachments 48.

More particularly, the bosses 5810 at the ends of the base portion are fastened together with the second printed circuit board 40 to the attachments 54.

At the intermediate attachments 48, the second printed circuit board 40 is approached together with the attachment surface portions 54 of the intermediate attachments 48 to the thermal-conduction surface 5802.

Therefore, the thermal-conduction surface 5802 and heat release surfaces 4202 are brought into nearly close contact with each other with the heat release grease 64 between them.

When the electronic parts 42 dissipate heat while being in action, the heat is efficiently conducted from the heat release surfaces 4202 to the thermal-conduction surface 5802 via the heat release grease 64, and effectively released from the heat sink 46 to the ambient air.

Next, a description will be made of a case where the electronic parts 42 are obliquely mounted on the second printed circuit board 40 or the second printed circuit board 40 is deformed to warp in the thickness direction thereof.

As mentioned above, beforehand, the heat release grease 64 is applied to either or both of the thermal-conduction surface 5802 and heat release surfaces 4202, and the thermal-conduction surface 5802 of the heat sink 46 is abutted in common against the heat release surfaces 4202 of the plural electronic parts 42 with the heat release grease 64 between them.

In this case, since the electronic parts 42 are mounted on the second printed circuit board 40 while being tilted, a gap is created between the thermal-conduction surface 5802 and heat release surfaces 4202.

Otherwise, since the second printed circuit board 40 is warped in the thickness direction thereof, a gap is created between the thermal-conduction surface 5802 and heat release surfaces 4202.

The male screws N are inserted into the screw insertion holes 5804, penetrated through the second printed circuit board 40, and meshed with the female screws 52 threaded in the plural attachments 48.

The attachments 48 capable of being displaced in the thickness direction of the second printed circuit board 40 are approached to the thermal-conduction surface 5802 due to the fastening force of the male screws N.

Therefore, the portions of the second printed circuit board 40 abutted against the attachments 48 capable of being displaced in the thickness direction are displaced together with the attachments 48 to approach the thermal-conduction surface 5802.

As a result, the gap between the thermal-conduction surface 5802 and heat release surfaces 4202 is eliminated, and the thermal-conduction surface 5802 and heat release surfaces 4202 are brought into nearly close contact with each other with the heat release grease 64 between them.

Therefore, when the electronic parts 42 dissipate heat while being in action, the heat is efficiently conducted from the heat release surfaces 4202 to the thermal-conduction surface 5802 via the heat release grease 64, and effectively released from the heat sink 46 to the ambient air.

Next, an operation exerted by the current plate 62 will be described below.

As shown in FIG. 11, heat dissipated from the electronic parts 42 is conducted to the base portion 58 by way of the heat release surfaces 4202, heat release grease 64, and thermal-conduction surface 5802.

The heat conducted to the base portion 58 is released from the fins 6002 of the heat release member 60 to the ambient air. In other words, the ambient air of the fins 6002 is warmed.

The air warmed around the fins 6002 rises along the fins 6002, and finally reaches the current plate 62.

Part of the air having reached the current plate 62 passes through the heat release holes 6210, moves upward, passes through the slits 35D of the upper cover 35 shown in FIG. 4, and is thus routed to outside the housing 24.

The remaining air having reached the current plate 62 has the orientation thereof changed while being routed to the current plate 62, moves backward and upward along the slope of the current plate 62, passes through the slits 35D of the upper cover 35 shown in FIG. 4, and is thus routed to outside the housing 24.

Since the current plate 62 is disposed as mentioned above, air warmed with heat released from the heat sink 46 is not locally stagnated in the housing 24 but is diffused in the housing 24 by the current plate 62.

This is advantageous in effectively releasing heat using the heat sink 46.

In addition, part of the housing 24, for example, part of the upper cover 35 opposed to the heat sink 46 is locally warmed to have the temperature thereof raised. The portion having the temperature thereof raised frightens a user who touches the portion. This kind of incident can be advantageously avoided.

In particular, as far as an electronic equipment that is requested to be compact or low-cost and has no room for a cooling fan is concerned, since an airflow can be created by the current plate 62, a rise in the temperature of the interior of the housing 24 can be advantageously suppressed.

The structure of the heat sink 46 including the current plate 62 can be applied to even an electronic equipment devoid of the attachments 48 capable of being displaced.

The current plate 62 may conceivably be attached to the upper cover 35.

However, in this case, if the disposition of the heat sink 46 is changed, the design of the mold for the upper cover 35 has to be modified. This is disadvantageous in terms of a cost. In addition, since the screw members for use in attaching the current plate 62 are bared on the surface of the upper cover 35, the superiority in the design of the electronic equipment 10 is degraded.

In contrast, when the current plate 62 is attached to the heat sink 46 as it is in the present embodiment, it becomes unnecessary to re-design the mold for the cover 35 along with a change in the disposition of the heat sink 46. This is cost-effective.

Since the screw members are not bared on the surface of the upper cover 35, the superiority in the design of the electronic equipment 10 can be ensured.

According to the present embodiment, at least one of the plural attachments 48 to be used to attach the heat sink 46 together with the second printed circuit board 40 can be displaced in the thickness direction of the second printed circuit board 40.

Therefore, the gap between the thermal-conduction surface 5802 and heat release surfaces 4202 derived from the tilt of the electronic parts 42 or the warp of the second printed circuit board 40 can be eliminated, and the thermal-conduction surface 5802 and heat release surfaces 4202 can be brought into nearly close contact with each other via the heat release grease 64 between them.

Therefore, the inexpensive heat release grease 64 can be substituted for the thermal-conduction sheet. Eventually, while a cost is reduced, heat dissipated from the electronic parts 42 can be advantageously released.

According to the present embodiment, the attachments 48 at both ends out of the linearly juxtaposed attachments are not permitted to be displaced in the thickness direction of the second printed circuit board 40, while the intermediate attachments 48 can be displaced in the thickness direction of the second printed circuit board 40.

Noted is that at least one of the plural attachments 48 should be able to be displaced in the thickness direction of the second printed circuit board 40.

Specifically, as long as the gap between the thermal-conduction surface 5802 and heat release surfaces 4202 which is derived from the tile of the electronic parts 42 or the warp of the second printed circuit board 40 can be eliminated, the number of attachments 48 capable of being displaced in the thickness direction of the second printed circuit board 40 and the disposition thereof may be arbitrarily determined.

The present embodiment has been described on the assumption that the plural attachments 48 are linearly juxtaposed. Alternatively, the attachments 48 may be disposed along, for example, a rectangular frame or may be disposed arbitrarily.

(Second Embodiment)

Next, the second embodiment will be described below.

The second embodiment is a variant of the first embodiment in terms of the attachments capable of being displaced in the thickness direction of the second printed circuit board 40.

Figure 12:
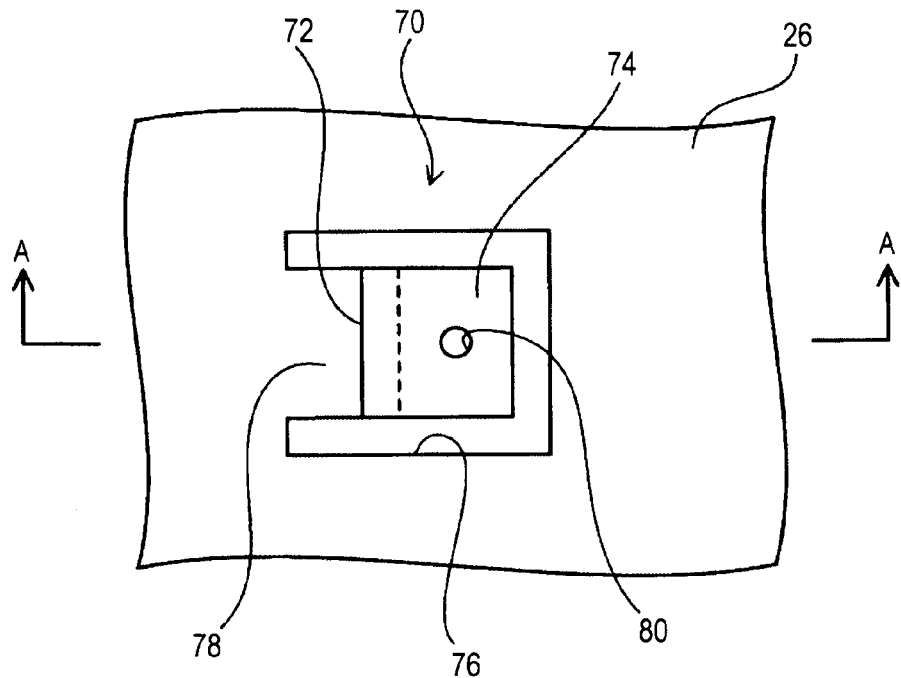
FIG. 12 is a plan view of an attachment employed in the second embodiment.
Figure 13:
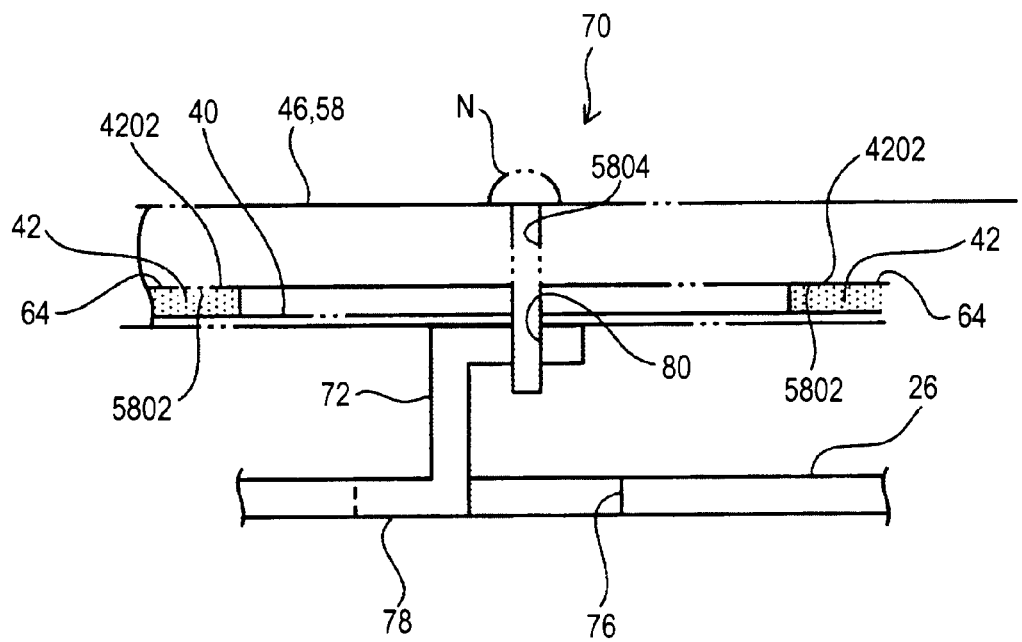
FIG. 13 is a sectional view of the attachment along an A-A cutting-plane line shown in FIG. 12.

FIG. 12 is a plan view of an attachment 70 employed in the second embodiment, and FIG. 13 is a sectional view of the attachment along an A-A cutting-plane line shown in FIG. 12. Hereinafter, the same reference numerals are assigned to parts or members of the second embodiment identical to those of the first embodiment. An iterative description will be omitted.

As shown in FIG. 12 and FIG. 13, the attachment 70 includes a connection piece 78 formed within a notch 76 and connected to the bottom plate 26, a rise piece 72 that rises from the end of the connection piece 78, and an attachment surface portion 74 formed on the distal part of the rise piece 72.

A female screw 80 is threaded in the attachment surface portion 74.

When the connection piece 78 is elastically deformed, the attachment 70 is displaced in the thickness of the second printed circuit board 40.

The second printed circuit board 40 and heat sink 46 are attached to the housing 24 as described below.

The male screws N inserted into the screw insertion holes 5804 are penetrated through the second printed circuit board 40, and meshed with the female screws 80 of the respective attachments 70, whereby the heat sink 46 is attached together with the second printed circuit board 40 to the attachments 70.

More particularly, the bosses 5810 at the ends of the heat sink are fastened together with the second printed circuit board 40 to the attachment surface portions 74.

The connection pieces 78 of the intermediate attachments 70 are elastically deformed, whereby the second printed circuit board 40 is approached together with the attachment surface portions 74 of the intermediate attachments 70 to the thermal-conduction surface 5802.

Eventually, the thermal-conduction surface 5802 and heat release surfaces 4202 are brought into nearly close contact with each other with the heat release grease 64 between them.

Therefore, when the electronic parts 42 dissipate heat while being in action, the heat is efficiently conducted from the heat release surfaces 4202 to the thermal-conduction surface 5802 via the heat release grease 64, and effectively released from the heat sink 46 to the ambient air.

Therefore, even when the attachment 70 employed in the second embodiment is adopted, the same advantage as that provided by the first embodiment is provided.

The embodiment has been described on the assumption that the electronic equipment 10 is a DVD player. The electronic equipment 10 is not limited to an audio equipment. The present invention can be applied to a variety of electronic equipments.

The present application contains subject matter related to that disclosed in Japanese Priority Patent Application JP 2009-141599 filed in the Japan Patent Office on Jun. 12, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic equipment comprising:
an attachment plate;
a plurality of attachments disposed on the attachment plate and each provided with a female screw;
a printed circuit board placed on the plurality of attachments;
a plurality of electronic parts which are mounted on the surface of the printed circuit board that faces in a direction opposite to the direction of the attachments, and whose surfaces facing in the direction opposite to the direction of the surface of the printed circuit board serves as heat release surfaces; and
a heat sink having a thermal-conduction surface and a plurality of screw insertion holes, wherein
the thermal-conduction surface is abutted in common against the heat release surfaces of the plurality of electronic parts with a heat release grease between them,
male screws inserted into the screw insertion holes are penetrated through the printed circuit board, and meshed with the female screws threaded in the plurality of attachments,
the heat sink is attached together with the printed circuit board to the attachments, and
at least one of the plurality of attachments can be displaced in the thickness direction of the printed circuit board.

2. The electronic equipment according to claim 1, wherein the plurality of screw insertion holes is penetrated through the thermal-conduction surface.

3. The electronic equipment according to claim 1, wherein
the attachment includes a leg portion that rises from the attachment plate, and an attachment surface portion that is formed on the distal part of the leg portion and that has the female screw threaded therein;
a plurality of slits is equidistantly formed in the attachment plate around the leg portion in such a manner that the slits adjoin one another;
the proximal part of the leg portion located to be opposite to the distal part, and the attachment plate are coupled to each other with a plurality of thin pieces each of which is sandwiched between the adjoining slits and elastically deformable; and
when the plurality of thin pieces is elastically deformed, the attachment capable of being displaced in the thickness direction of the printed circuit board is displaced in the thickness direction of the printed circuit board.

4. The electronic equipment according to claim 3, wherein the leg portion is shaped like a conical surface, and the plurality of thin pieces is extended in a direction orthogonal to the radial direction of the leg portion.

5. The electronic equipment according to claim 1, wherein the plurality of attachments is linearly juxtaposed, and the attachments at both ends out of the linearly juxtaposed attachments are not permitted to be displaced in the thickness direction of the printed circuit board, while the intermediate attachments can be displaced in the thickness direction of the printed circuit board.

6. The electronic equipment according to claim 1, further comprising a housing that has a bottom plate, wherein the attachment plate is realized with the bottom plate of the housing.

7. The electronic equipment according to claim 1, wherein
the heat sink includes a base portion, a heat release member, and a current plate;
the thermal-conduction surface is formed as one surface of the base portion;
the screw insertion holes are penetrated through the base portion;
the heat release member includes a plurality of fins that rise from the other surface of the base portion; and
the current plate is disposed to cover the plurality of fins from above the plurality of fins, and tilted with respect to the horizontal plane.

8. The electronic equipment according to claim 7, wherein the current plate is borne by one of the plurality of fins.

* * * * *